United States Patent [19]
Sturm

[11] 3,797,383
[45] Mar. 19, 1974

[54] SCREW PRESS
[75] Inventor: Robert M. Sturm, Sidney, Ohio
[73] Assignee: The French Oil Mill Machinery Company, Piqua, Ohio
[22] Filed: Apr. 24, 1972
[21] Appl. No.: 246,710

[52] U.S. Cl. .................................. 100/145, 24/268
[51] Int. Cl. ................................................ B30b 3/00
[58] Field of Search .......... 100/145, 146, 147, 148, 100/149, 150, 117, 93, 48; 425/190, 192, 188

[56] References Cited
UNITED STATES PATENTS
| | | | |
|---|---|---|---|
| 1,463,749 | 7/1923 | Pollack | 24/268 X |
| 2,538,316 | 1/1951 | Killip | 100/145 |
| 2,556,499 | 6/1951 | Killip | 100/145 X |
| 3,231,298 | 1/1966 | Tomb et al. | 24/268 X |

FOREIGN PATENTS OR APPLICATIONS
464,609  1/1914  France ................................ 24/268

Primary Examiner—Peter Feldman
Attorney, Agent, or Firm—Biebel, French & Bugg

[57] ABSTRACT

The cage of a screw press is divided into two hingedly separable sections for access to the interior thereof to clean and service the cage and shaft. Complementary clamping surfaces on the cage sections join to form a dovetail flange. The flange is clamped together by a removable clamp to hold the cage sections firmly together. Screws in the clamp drive the clamp and the dovetail flange inclined surfaces together to provide a mechanical advantage in holding the cage sections together.

4 Claims, 3 Drawing Figures

PATENTED MAR 19 1974  3,797,383

SCREW PRESS

BACKGROUND OF THE INVENTION

This invention relates to screw presses, and more particularly to screw presses which are designed for continuous operation. Such screw presses must on occasion be disassembled for routine or for emergency maintenance and service, and to facilitate such disassembly, the exterior housing, or cage, of the screw press is usually fabricated in two or more sections. Due to the extremely high compressive and shear forces present in such screw presses, the cage sections must be exceptionally well united. This is commonly accomplished with a large number of large and very strong bolts distributed across the mating faces of the cage sections. These must be torqued together with great force, and as a result considerable time and effort is required to disassemble and reassemble a screw press when servicing becomes necessary.

SUMMARY OF THE INVENTION

Briefly, a preferred embodiment of this invention includes a screw press in which the cage surrounding the shaft is in two longitudinally separable sections. The cage sections each have mating faces which are adapted to be clamped together. Each section has a flange extending adjacent the clamping surface, and the joined flanges form a dovetail flange onto which a clamp may be placed, to hold the cage sections together.

A generally U-shaped clamp engages the dovetail flange parts along the sloping surfaces thereof. A pair of screws in the clamp may be tightened against the dovetail flange to urge the clamp in a direction away from the cage. As the clamp is thus urged, a mechanical advantage is obtained along the inclined surfaces of the dovetail flange and the complementary surfaces of the clamp. As a result, a modest amount of torque applied to the clamp screws will result in a very much greater clamping force to drive and hold the cage sections firmly together.

The cage sections may thus be joined together easily in a tightly locked fashion, or separated for servicing, with only a minor amount of labor.

It is therefore an object of this invention to provide a screw press in which separable cage sections may be quickly and easily clamped together or separated; in which the clamping or unclamping may be accomplished with a minimum of effort and inconvenience; in which a very high degree of clamping force may be accomplished with the application of a much lesser force; in which the longitudinally separable sections of the cage have mating faces adapted to be clamped together along clamping surfaces opposite from the mating faces; in which the clamping surfaces, and hence the mating faces, are held firmly together by a releasable clamp means; and to accomplish all of the above objects and purposes in an uncomplicated, reliable, durable, and serviceable configuration having the high strength necessary for the intended environment.

Other objects and advantages of the invention will be apparent from the following description, the accompanying drawings, and the appended claims.

DESCRIPTION OF THE PREFERRED EMBODIMENTS

Figure 1:
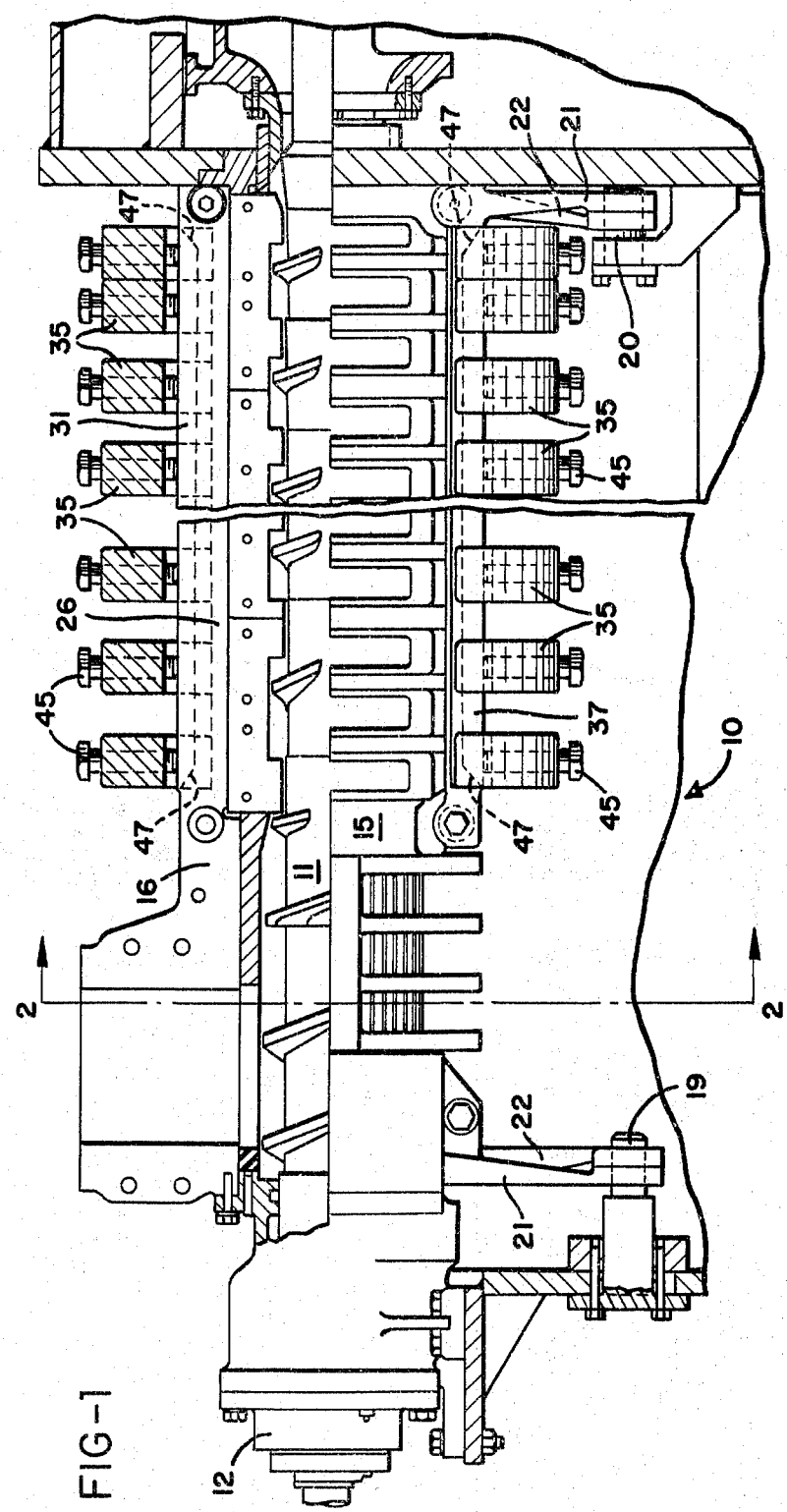
FIG. 1 is a partial cross sectional view of a screw press according to this invention.
Figure 2:
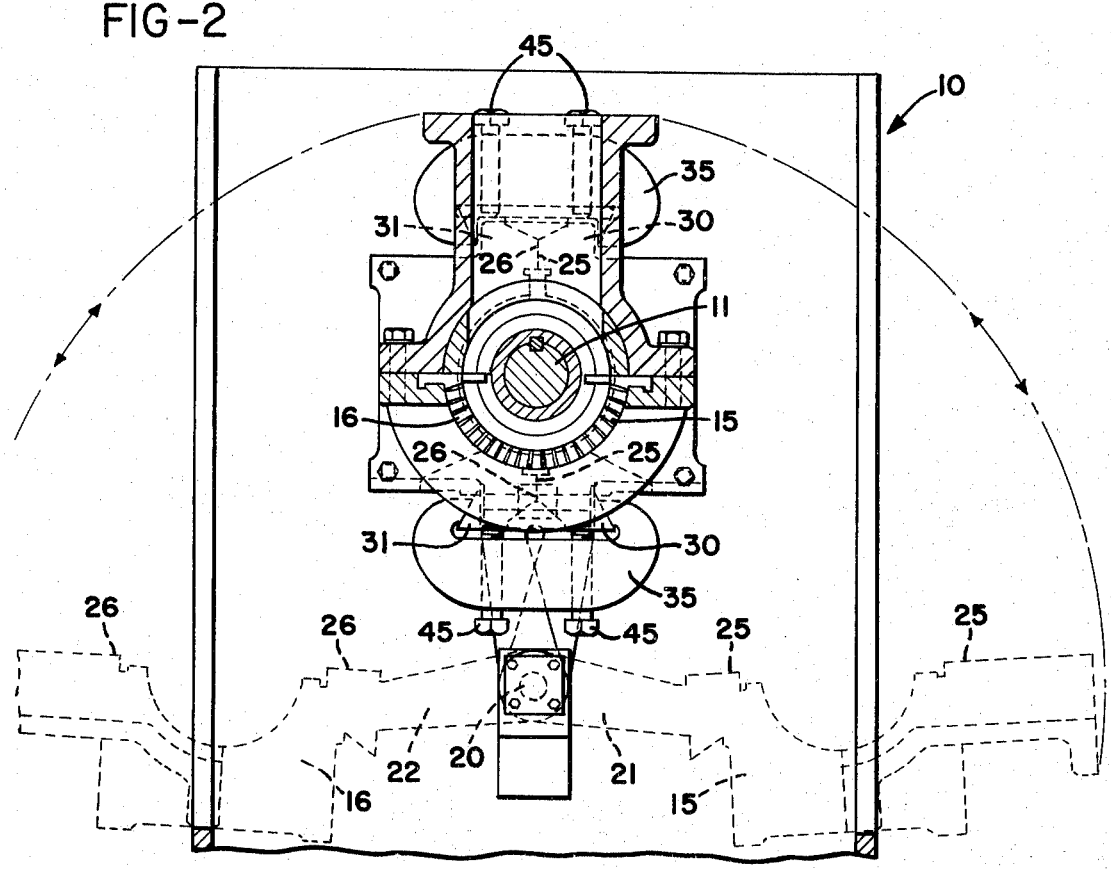
FIG. 2 is a partial sectional view of the FIG. 1 apparatus taken along line 2—2 thereof, and also illustrating the cage sections, in phantom, moved to an open position.
Figure 3:
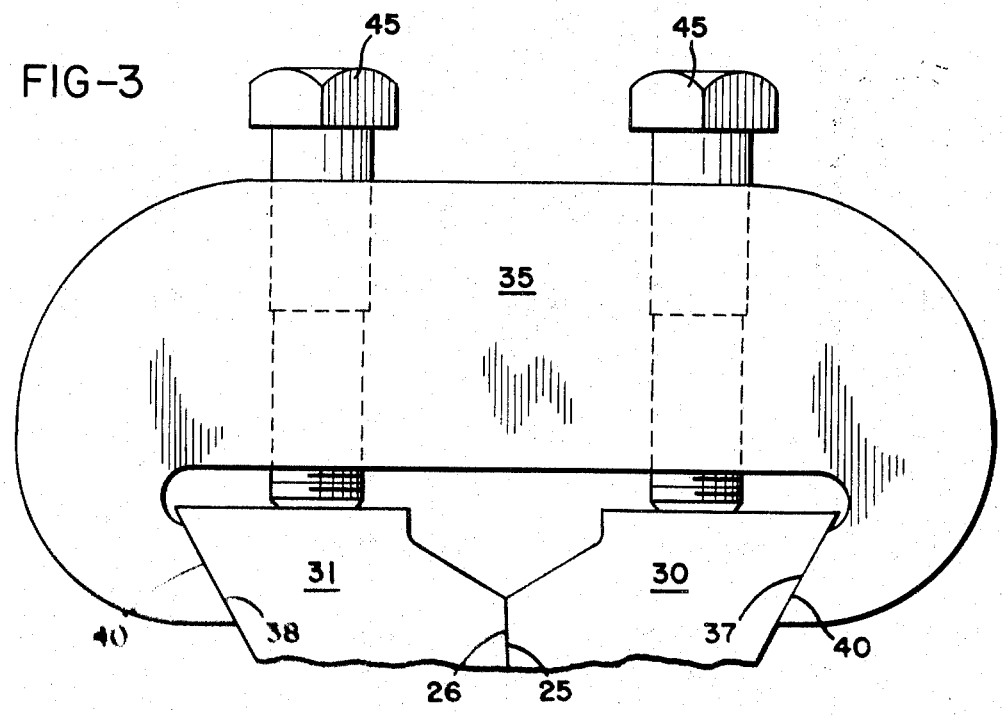
FIG. 3 is a partial cross sectional view of a clamp and a portion of the flanges of the FIG. 1 device clamped together.

With reference to the drawings, and more particularly to FIG. 1, there is illustrated a screw press 10 constructed in accordance with this invention. Screw press 10 includes a shaft 11 which is driven by a drive 12. Shaft 11 is enclosed within a cage which is divided into two longitudinally separable sections 15 and 16.

The cage is hinged at hinges 19 and 20 to allow the cage sections 15 and 16 easily to be swung thereabout into position on their respective cage arms 21 and 22. Each of the cage sections 15 and 16 joins the other along respective mating faces 25 and 26. Faces 25 and 26 are, in turn, adjacent flange parts 30 and 31. The flange parts are generally triangular in cross section, so that when brought adjacent one another, as the cage is closed, they form dovetails. As may be seen in FIG. 1, both the mating faces 25 and 26, at the top and bottom of the cage, are provided with the dovetail flange parts of this invention.

A plurality of clamps 35 releasably engage clamping surfaces 37 and 38 on the outside of complementary dovetail flange parts 30 and 31. The clamps are applied at appropriate locations longitudinally along the length of the cage, and each clamp 35 includes clamp surfaces 40 which are disposed at an angle to engage clamping surfaces 37 and 38. Clamp 35 is also provided with clamp screws 45 which may be turned down against flange parts 30 and 31 to drive clamp 35 in a direction away therefrom. When clamp screws 35 are thus tightened, they will bring clamp surfaces 40 against clamping surfaces 37 and 38 to cooperate therewith in providing a mechanical advantage along the inclined surfaces defined thereby. By this means a nominal amount of force applied by clamp screws 45 will result in a very much greater force driving and clamping the cage sections firmly together. The amount of force exerted by screws 45 is in fact only approximately 22 percent of that which results between mating faces 25 and 26.

As a result, the cage may easily be opened and closed. The cage is opened by turning the clamp screws only enough to allow the clamps to be slid off the ends of flange parts 30 and 31. In closing the cage, the clamp screws need only be turned a few turns, with only a nominal amount of force, to bring the cage sections into exceptionally tight engagement.

Flange parts 30 and 31 are also provided with bevels 47 on the ends thereof to guide clamps 35 easily and quickly thereonto, facilitating reassembly of the screw press. Reassembly of the press is further facilitated by the use of hinges 19 and 20 and arms 21 and 22 which bring cage sections 15 and 16 immediately into correct alignment when the cage is closed.

As may be seen, therefore, this invention has numerous advantages. It is strong, rugged, is very easily and quickly disassembled and reassembled for cleaning and servicing, and is readily adaptable to a wide variety of screw press applications. For example, the cage may be formed of three or more sections, each of which may then be joined to the others by the complementary dovetail flanges and clamps of this invention.

While the form of apparatus herein described constitutes a preferred embodiment of this invention, it is to be understood that the invention is not limited to this precise form of apparatus, and that changes may be made therein without departing from the scope of the invention.

What is claimed is:

1. In a screw press including a shaft and a surrounding cage formed of at least two longitudinally separable sections, said cage sections each having mating faces adapted to be clamped together, the improvement comprising:
   a. complementary, longitudinally extending clamping surfaces on the exterior of said cage sections opposite from said faces, said clamping surfaces diverging from one another in a direction away from said cage sections, and
   b. releasable clamp means engaging said clamping surfaces to hold said mating faces of the cage sections firmly together during operation of the screw press.

2. The screw press of claim 1 wherein said clamping surfaces form the complementary sides of an outwardly diverging dovetail flange with the sections joined, and said releasable clamp means includes clamp surfaces engageable with the surfaces of said dovetail flange and cooperating therewith to provide a mechanical advantage to enable the cage sections easily to be clamped firmly together.

3. In a screw press including a shaft and a surrounding cage, the cage being formed of at least two separable sections having mating faces, the improvement comprising:
   a. complementary outwardly diverging dovetail flange parts on the separate sections of the cage,
   b. releasable clamp means for engaging said dovetail flange parts with the mating faces adjoining to hold the cage sections firmly together during operation of the press,
   c. clamp surfaces on said clamp means engageable with said dovetail flange parts and cooperating therewith to provide a mechanical advantage outwardly along the inclined surfaces defined thereby enabling the cage sections easily to be clamped firmly together, and
   d. means for urging said clamp surfaces outwardly against said flange parts to drive the cage sections firmly together.

4. In a screw press including a shaft and a surrounding cage, the cage being formed of at least two separable sections having mating faces, the improvement comprising:
   a. complementary dovetail flange parts on the separate sections of the cage,
   b. releasable clamp means for engaging said dovetail flange parts with the mating faces adjoining to hold the cage sections firmly together during operation of the press,
   c. clamp surfaces on said clamp means engagable with said dovetail flange parts and cooperating therewith to provide a mechanical advantage along the inclined surfaces defined thereby enabling the cage sections easily to be clamped firmly together, and
   d. means including at least one screw operative between said clamp means and the cage for urging said clamp surfaces against said flange parts to drive the cage sections firmly together.

* * * * *